WARD & BEAN.
Cane Stripper.
No. 84,324. Patented Nov. 24, 1868.
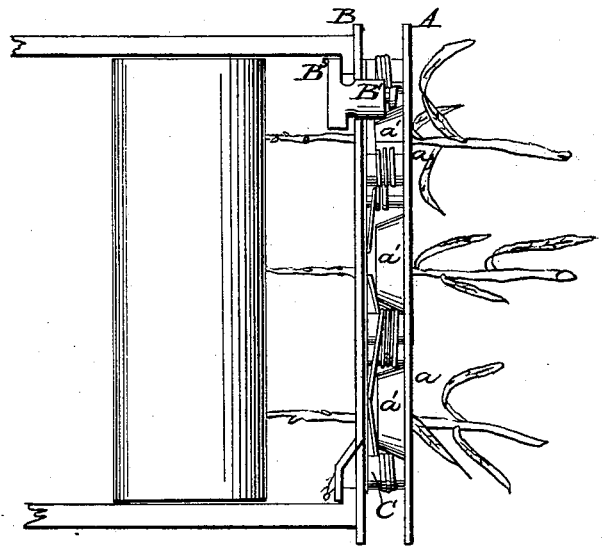
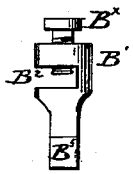
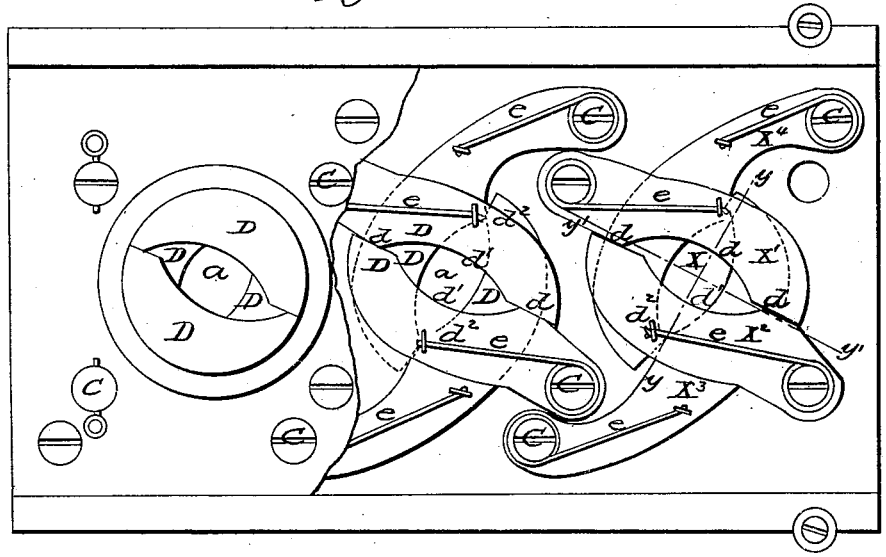

A. F. WARD AND J. H. BEAN, OF MARIETTA, OHIO.

*Letters Patent No. 84,324, dated November 24, 1868.*

IMPROVEMENT IN CANE AND WILLOW-STRIPPER.

The Schedule referred to in these Letters Patent and making part of the same.

*To all whom it may concern:*

Be it known that we, A. F. WARD, of Marietta, in the county of Washington, and State of Ohio, and J. H. BEAN, of Marietta, in the county of Washington, and State of Ohio, have invented a new and improved Cane and Willow-Stripper; and we do hereby declare that the following is a full and exact desription of the same, reference being had to the accompanying drawings, and to the letters of reference marked thereon.

This invention, which we call "The Improved Cane and Willow-Stripper," consists principally in a novel construction of scrapers, so arranged as to adapt themselves, automatically, to the various sizes of the cane, as will be fully described hereinafter.

Figure 1 represents a side elevation of our improved stripper, as attached to a cane-mill; and Figure 2, a front elevation, with part of the casing broken away to show the internal arrangement of the scrapers and springs.

The same letters refer to identical parts in the different figures.

In the drawings, A and B represent, respectively, the front and rear casings of our improved stripper, in both of which are the openings $a\ a$, as shown.

The openings in the front casing are provided with inclined edges, as shown at $a'$, in fig. 1, in order that the cane may be easily guided thereinto.

$c\ c$ represent standards rigidly attached to plate B, which are located at suitable points on said plate, around the openings $a$, and at proper distances apart.

D D represent scrapers, or strippers proper, of shape shown in fig. 2, which swing upon the standards $c\ c$. These scrapers are constructed with the straight edges $d$, and curving edges $d^1$, and are so arranged as to rest ordinarily with their straight edges bearing on each other, as shown in fig. 2, being held firmly in that position by the springs $e$.

It will be observed, also, that the scrapers are arranged in pairs, and that each set consists of two pairs, one being located in front of the other, and that the curving edges of each pair are opposite each other, by which means an opening is made between them.

It will be further observed, also, that each set of scrapers is so arranged that the pairs, in opening, move in directions at right angles to each other that is, when the cane is passed through the opening at $x$, fig. 2, the scrapers $x^1\ x^2$ will be forced open nearly on the line $y$–$y$, while the scrapers $x^3\ x^4$ will be moved nearly in the line $y'$–$y'$.

$e\ e$ represent springs, one end of each of which is attached to the standard $c$, and the other to scrapers D, as shown by means of the staple $d^2$.

The springs may be attached to the standard by inserting one end of the former into a hole of proper size bored into the latter, or, if desired, the standard may be cut down through the centre, as shown in fig. 2, and the end of the spring be placed within the groove.

The manner of attaching our stripper to the mill is clearly shown in fig. 1.

$b$ represents a projecting catch, which hooks over the rim of the mill-frame, which catch is formed by cutting the plate B a short distance upward, on each side, at the lower end, as shown, and by bending the strip, so formed, outward and downward.

The upper end of the stripper is held by the adjustable catch $B^1$, which is constructed with the slot $B^2$, fig. 3, set-screw $B^4$, and hook $B^5$. The edge of the plate B rests within the slot, and the catch is adjusted up or down, to suit the various sizes of mills, and also for the purpose of making the attachment. After placing the stripper in position, the lower catches $b$, being caught over the rim of the mill-frame, the catch $B^1$ should be moved up on the plate, until its hook is caught under the upper rim of the mill-frame, when, by simply tightening the set-screw, the whole apparatus is firmly kept in place.

The operation of our invention is as follows:

The stripper having been attached to the mill, as described, the canes are thrust in through the openings $a$, of the former, until the tips are caught by the rollers, when they will be necessarily drawn through the openings and into the mill, without further attention, being thoroughly stripped by the operation, as will be readily seen.

The scrapers, having blunt edges, do not cut the cane, but simply strip it, the springs yielding sufficiently to permit all sizes of cane to be easily passed through, but, at the same time, keeping the scrapers up to their work, so that no part is left unstripped.

The utility of the arrangement, whereby each pair of scrapers opens in a different line of direction, will be readily seen, as, otherwise, different sizes of cane could not be readily stripped.

We do not confine ourselves to the precise arrangement, as shown, as many simple variations may be made, without departing from the spirit of our invention.

Having thus fully described our invention,

What we claim as new, and desire to secure by Letters Patent, is—

1. The cane-stripper described, consisting of the plates A B, standards $c$, scrapers D, and springs $e$, all being constructed and operated substantially as and for the purpose set forth.

2. The plate B with catches $b$, in combination with the adjustable catch $B^1$, when operated in connection with a mill-frame, as described.

This specification signed and witnessed, this 20th day of July, 1868.

A. F. WARD.
J. H. BEAN.

Witnesses:
HENRY BOHL,
C. E. GLINES.

*Ass'rs to themselves, J. W. L. Brown, L. S. Brown & Samuel Bean*